(12) United States Patent
Bowerman et al.

(10) Patent No.: US 10,143,955 B2
(45) Date of Patent: Dec. 4, 2018

(54) CORRUGATED FILTER MEDIA WITH MODULATED CORRUGATIONS

(71) Applicant: Cummins Filtration IP, Inc., Columbus, IN (US)

(72) Inventors: Jeff A. Bowerman, Cookeville, TN (US); Michael T. Zuroski, Sun Prairie, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 399 days.

(21) Appl. No.: 14/772,013

(22) PCT Filed: Mar. 3, 2014

(86) PCT No.: PCT/US2014/019946
§ 371 (c)(1),
(2) Date: Sep. 1, 2015

(87) PCT Pub. No.: WO2014/137917
PCT Pub. Date: Sep. 12, 2014

(65) Prior Publication Data
US 2016/0016106 A1 Jan. 21, 2016

Related U.S. Application Data

(60) Provisional application No. 61/775,067, filed on Mar. 8, 2013.

(51) Int. Cl.
*B01D 29/33* (2006.01)
*B01D 46/52* (2006.01)
(Continued)

(52) U.S. Cl.
CPC ......... *B01D 46/522* (2013.01); *B01D 29/333* (2013.01); *B01D 39/00* (2013.01); *B01D 39/18* (2013.01); *B01D 2201/12* (2013.01)

(58) Field of Classification Search
CPC .... B01D 29/353; B01D 39/18; B01D 46/522; B01D 2201/12
See application file for complete search history.

(56) References Cited

U.S. PATENT DOCUMENTS 4,181,070 A * 1/1980 Robbins ............. B01D 46/0001
493/287
4,482,366 A * 11/1984 Camplin ............ B01D 46/0068
137/835
(Continued)

FOREIGN PATENT DOCUMENTS

CN 1578697 A 2/2005
CN 101608563 A 12/2009
(Continued)

OTHER PUBLICATIONS

"Superimpose" definition, Merriam-Webster, accessed Mar. 19, 2018, 1 page.*
(Continued)

*Primary Examiner* — Patrick J Orme
(74) *Attorney, Agent, or Firm* — Foley & Lardner LLP

(57) ABSTRACT

A filter media in which larger corrugations are impressed or embossed onto media that has been previously corrugated with standard corrugations. This construction greatly increases the beam strength of a resulting pleat that allows the channels to remain open during processing into the pleated media, and prevents buckling of the media duping gathering on current pleating equipment. In addition, once the media is pleated, the larger corrugations or embossments, combined with the standard corrugations, create large channels for fluid flow from pleat tip to the base of the pleat.

20 Claims, 6 Drawing Sheets

(51) Int. Cl.
  *B01D 39/00* (2006.01)
  *B01D 39/18* (2006.01)

(56) References Cited

U.S. PATENT DOCUMENTS

| | | | |
|---|---|---|---|
| 5,919,122 A * | 7/1999 | Geiger | B01D 29/012 |
| | | | 219/121.7 |
| 6,273,938 B1 | 8/2001 | Fanselow et al. | |
| 6,290,635 B1 * | 9/2001 | Demmel | B01D 46/0001 |
| | | | 156/73.1 |
| 8,236,249 B2 * | 8/2012 | Doring | B01D 45/02 |
| | | | 422/170 |
| 2007/0102101 A1 | 5/2007 | Spearin et al. | |
| 2010/0032365 A1 | 2/2010 | Moe et al. | |
| 2010/0078379 A1 | 4/2010 | Rocklitz | |
| 2011/0186504 A1 | 8/2011 | Rocklitz | |
| 2011/0259813 A1 | 10/2011 | Wertz et al. | |
| 2014/0325946 A1 | 11/2014 | Rocklitz et al. | |
| 2015/0047507 A1 | 2/2015 | Fox et al. | |

FOREIGN PATENT DOCUMENTS

| | | |
|---|---|---|
| JP | S58-166906 | 10/1983 |
| WO | WO-2017/146935 | 8/2017 |

OTHER PUBLICATIONS

First Office Action issued for Chinese App. No. 201480011707.0 with English Language Translation, dated May 12, 2016, 16 pages.
International Search Report and Written Opinion for PCT/US2014/019946, dated Jun. 12, 2014, 8 pages.
International Search Report and Written Opinion for International Application No. PCT/US2017/017765, dated Apr. 24, 2017, 9 pages.

* cited by examiner

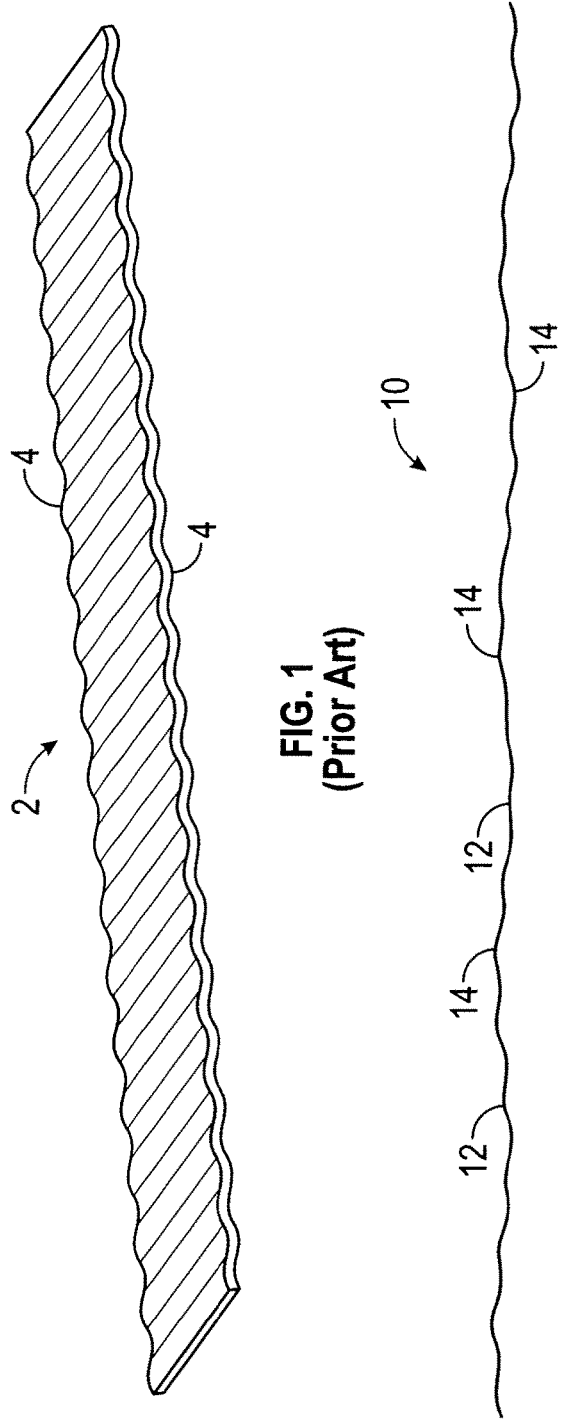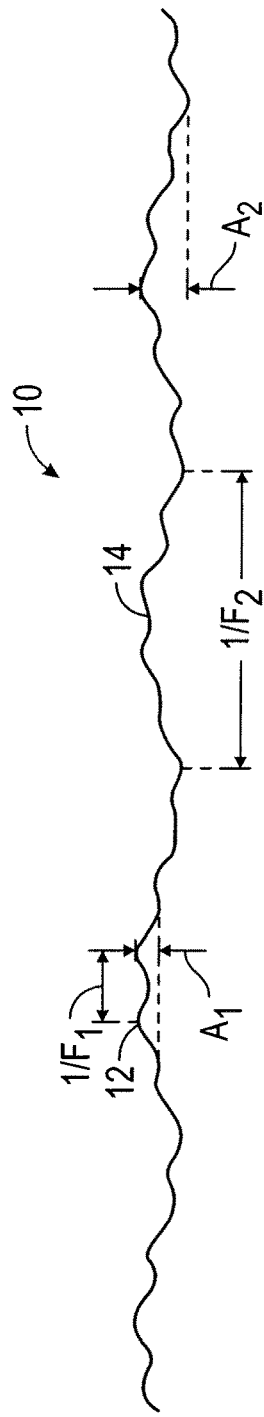

CORRUGATED FILTER MEDIA WITH MODULATED CORRUGATIONS

CROSS REFERENCE TO RELATED APPLICATIONS

This Application is a National Stage of PCT Application No. PCT/US2014/019946, filed Mar. 3, 2014, which claims priority to U.S. Provisional Patent Application No. 61/770,067 filed Mar. 8, 2013. The contents of these applications are hereby incorporated by reference in their entirety and for all purposes.

TECHNICAL FIELD

This disclosure generally pertains to the field of filtration, and more particularly to a corrugated filter media where the corrugations are modified to improve pleatability and filtration performance.

BACKGROUND

In pleated air filters, the dust holding capacity in high dust applications can be reduced by up to 40% or more due to improper pleat shape. Pleats that curve or are bent can block air flow from getting all the way to the base of the pleat. This is especially problematic in pleats over 2 inches deep.

As shown in FIG. 1, it is known to form filter media 2 with corrugations 4. The corrugations 4 help give the media 2 stiffness. The corrugations 4 are typically large in frequency and small in amplitude and are often insufficient to maintain the pleat straightness during the pleating process. This may cause a bend or curve in the final pleated and folded filter formed with the filter media 2.

In some situations, filter media manufacturers address the above noted issues by increasing the basic corrugation amplitude and reducing the frequency of the corrugations (e.g., to approximately four corrugations per inch). However, increasing the corrugation amplitude and reducing the corrugation frequency can be an expensive because it requires precise control of paper conditions (i.e., if done in-house by a filter manufacturer) and/or require retooling of media manufacturing devices (i.e., if done by a paper mill). Further, the resulting media is difficult to handle, and the large corrugations will be reduced every time the media paper passes over a roller during slitting, pleating, and other manufacturing operations. In other situations, filter media manufacturers address the above noted issues by embossing a flat media by pressing the flat media with a large force. However, this requires precise control of the pleater and paper conditions to avoid tearing the paper media.

SUMMARY

A filter media and process of forming the filter media are described that improves pleatability of the filter media and improves filtration performance. The filter media can be, for example, used to filter air with the dust holding capacity being improved. However, the filter media, and the process used to produce the filter media, could be used for filtering other types of fluids, including fuel, oil or hydraulic fluids.

In one embodiment, larger corrugations are impressed or embossed onto media that has been previously corrugated with standard corrugations. This construction greatly increases the beam strength of the pleat that allows the channels to remain open during processing into the pleated media, and prevents buckling of the media during gathering on current pleating equipment. In addition, once the media is pleated, the larger corrugations or embossments, combined with the standard corrugations, create large channels for fluid flow from pleat tip to the base of the pleat.

The larger corrugations are superimposed on the media having the standard corrugations, with the larger corrugations having a smaller frequency (i.e. larger distance between peaks or valleys) and a larger amplitude than the standard, smaller corrugations. The larger corrugations run parallel to the smaller corrugations. The larger corrugations are able to be formed in the already corrugated media without tearing the media.

Another embodiment relates to a filter media. The filter media includes a plurality of first corrugations extending in a first direction and having a first amplitude and a first frequency. The filter media further includes a plurality of second corrugations extending in the first direction and having a second amplitude and a second frequency, the second amplitude greater than the first amplitude, and the second frequency is less than the first frequency. In some arrangements, the plurality of second corrugations are interspersed among the first corrugations. In further arrangements, the plurality of second corrugations extend upwardly and downwardly from the filter media. In additional arrangements, the first amplitude and the first frequency are constant. In still further arrangements, the second amplitude and the second frequency are constant. In another arrangement, the first frequency is about 6.3 corrugations per inch. In yet another arrangement, the second frequency is about 1.33 corrugations per inch.

A further embodiment relates to a filter. The filter includes a corrugated filter media. The corrugated filter media includes a plurality of first corrugations extending in a first direction and having a first amplitude and a first frequency. The corrugated filter media further includes a plurality of second corrugations extending in the first direction and having a second amplitude and a second frequency, the second amplitude greater than the first amplitude, and the second frequency is less than the first frequency. In some arrangements, the plurality of second corrugations are interspersed among the first corrugations. In further arrangements, the plurality of second corrugations extend upwardly and downwardly from the filter media. In additional arrangements, the first amplitude and the first frequency are constant. In still further arrangements, the second amplitude and the second frequency are constant. In another arrangement, the first frequency is about 6.3 corrugations per inch. In yet another arrangement, the second frequency is about 1.33 corrugations per inch.

Another embodiment relates to a method of processing a filter media. The method includes passing a corrugated media having first corrugations through an embossing mechanism to create second corrugations on the corrugated media, the first corrugations having a first amplitude and a first frequency, the second corrugations having a second amplitude that is greater than the first amplitude, the second corrugations having a second frequency that is less than the first frequency. In some arrangements, the method further includes directing the corrugated media through a pull-roll mechanism after passing the corrugated media through the embossing mechanism. In some configurations, the pull-roll mechanism is configured to not flatten out the second corrugations in the corrugated media. In another arrangement, the method further includes passing the corrugated media through an accumulator section. In a further arrangement, the embossing mechanism includes a pair of pleating rollers that are spaced apart from one another by a distance approximately equal to twice the first amplitude. In yet another arrangement, the method includes scoring the corrugated filter media with lateral scoring bars, the lateral scoring bars extending along a longitudinal length of two opposing pleating rollers.

These and other features, together with the organization and manner of operation thereof, will become apparent from the following detailed description when taken in conjunction with the accompanying drawings.

BRIEF DESCRIPTION OF THE FIGURES

FIG. 1 illustrates a portion of a known corrugated filter media.

FIG. 2A is an end view of a corrugated filter media formed with large corrugations among the smaller corrugations as described herein.

FIG. 2B is a close up view of FIG. 2A.

DETAILED DESCRIPTION OF THE PREFERRED EMBODIMENTS

Figure 3:
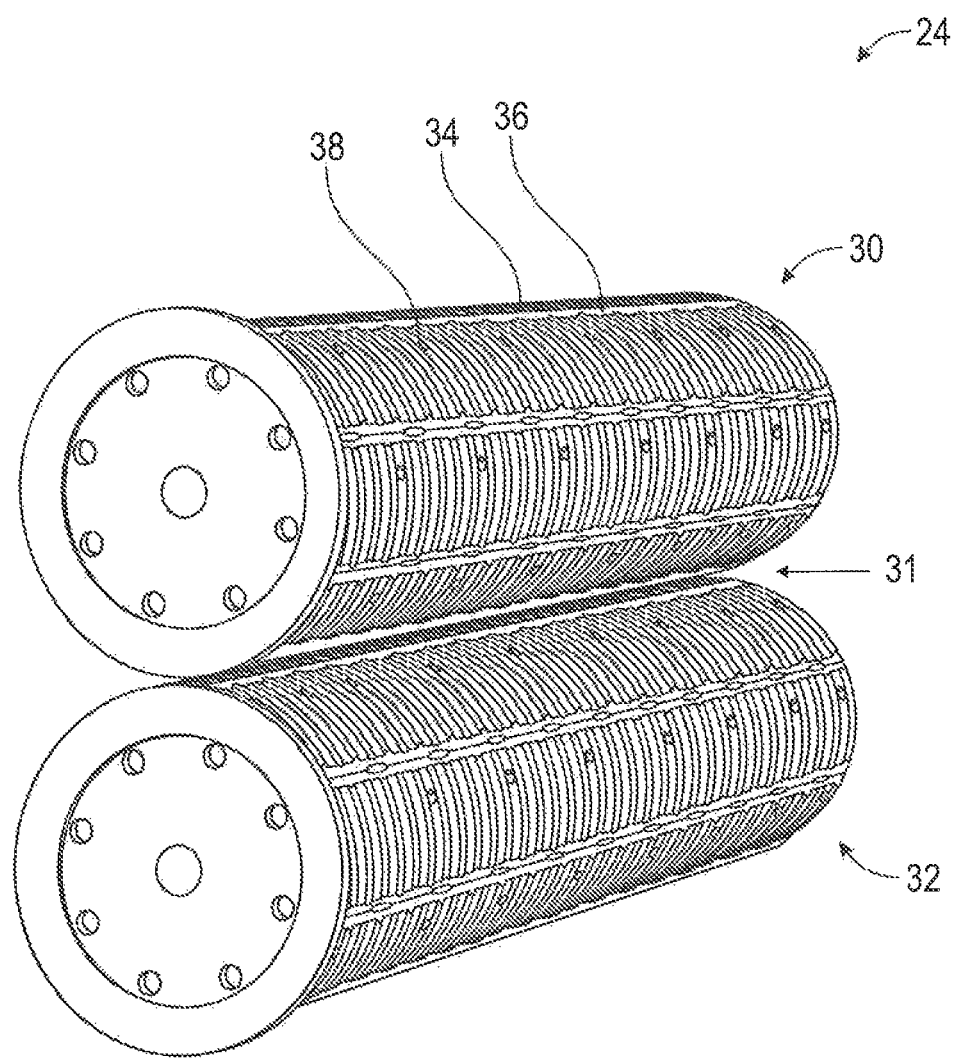
FIG. 3 illustrates pleating rollers that can be used to process the corrugated media.

With reference initially to FIGS. 2A and 2B, a corrugated filter media 10 that incorporates the concepts described herein is illustrated. The filter media 10 can be, for example, used to filter air or filtering other types of fluids, including fuel, oil or hydraulic fluids. The media 10 can be formed from, for example, standard cellulose material and can be termed paper media. The cellulose material may include polyester (e.g., the cellulose may comprise approximately 5% polyester), which reduces fracturing and tearing of the filter media 10 during later processing. In some arrangements, the filter media 10 is a multi-layer filter media including a base layer of cellulose, which may be strengthened with polyester as noted above, and a secondary layer of nano-media. The nano-media may comprise, for example, nylon 6 nano-fibers. The nylon 6 nano-fibers may have a diameter of approximately 150 nanometers. The filter media 10 may have a basis weight of approximately 70 pounds per 3,000 square feet. However, the concepts described herein could be applied to filter media formed from other materials.

The media 10 includes small corrugations 12, similar to the corrugations 4 in FIG. 1. The small corrugations have a frequency $F_1$ and an amplitude $A_1$. The media 10 further includes larger corrugations 14 that are superimposed on the smaller corrugations 12, with the larger corrugations 14 having a frequency $F_2$ and an amplitude $A_2$. The frequency $F_2$ is smaller (i.e. larger spacing between peaks and valleys) than the frequency $F_1$, and the amplitude $A_2$ is larger than the amplitude $A_1$.

The small corrugations 12 run parallel to each other in a direction into and out of the page (i.e. in a direction perpendicular to the frequency dimension and the amplitude dimension, and parallel to the direction of flow of the media through the processing equipment). Likewise, the larger corrugations 14 run parallel to each other in a direction into and out of the page (i.e. in a direction perpendicular to the frequency dimension and the amplitude dimension and parallel to the media flow direction) and run parallel to the smaller corrugations 12.

The terms "larger" and "large" used herein when referring to the amplitude refers to the amplitude of the corrugations 14 being larger relative to the amplitude of the corrugations 12 which as a result can be referred to as being smaller or small relative to the corrugations 14. The terms "smaller" and "small" used herein when referring to the frequency refers to the frequency of the corrugations 14 being smaller relative to the frequency of the corrugations 12 which as a result can be referred to as being larger or large relative to the corrugations 14.

In the illustrated example, the frequency and amplitude of the corrugations 12 and of the corrugations 14 are constant within the media 10. However, the frequency and amplitude of the corrugations 12, as well as of the larger corrugations 14, need not be constant, as long as the frequency or frequencies of the corrugations 14 are smaller than those of the corrugations 12 and the amplitude or amplitudes are larger than those of the corrugations 12 so as to achieve the advantages and benefits of the media described herein.

In FIGS. 2A and 2B, the corrugations 14 are on both sides of the media 10. In other words, some of the corrugations 14 extend upwardly when viewing FIGS. 2A and 2B while some of the corrugations 14 extend downwardly when viewing FIGS. 2A and 2B. The corrugations 14 that extend upwardly can also be termed positive corrugations and the corrugations 14 that extend downwardly can be termed negative corrugations. In some arrangements the positive corrugations and the negative corrugations have different amplitudes.

In one non-limiting example, the corrugation frequency $F_1$ is about 6.3 per inch (i.e. a spacing of about 0.158 inch between the peaks) and the frequency $F_2$ of the larger corrugations 14 is about 1.33 per inch (i.e. a spacing of about 0.75 inch between the peaks). However, other frequencies can be used.

Figure 4:
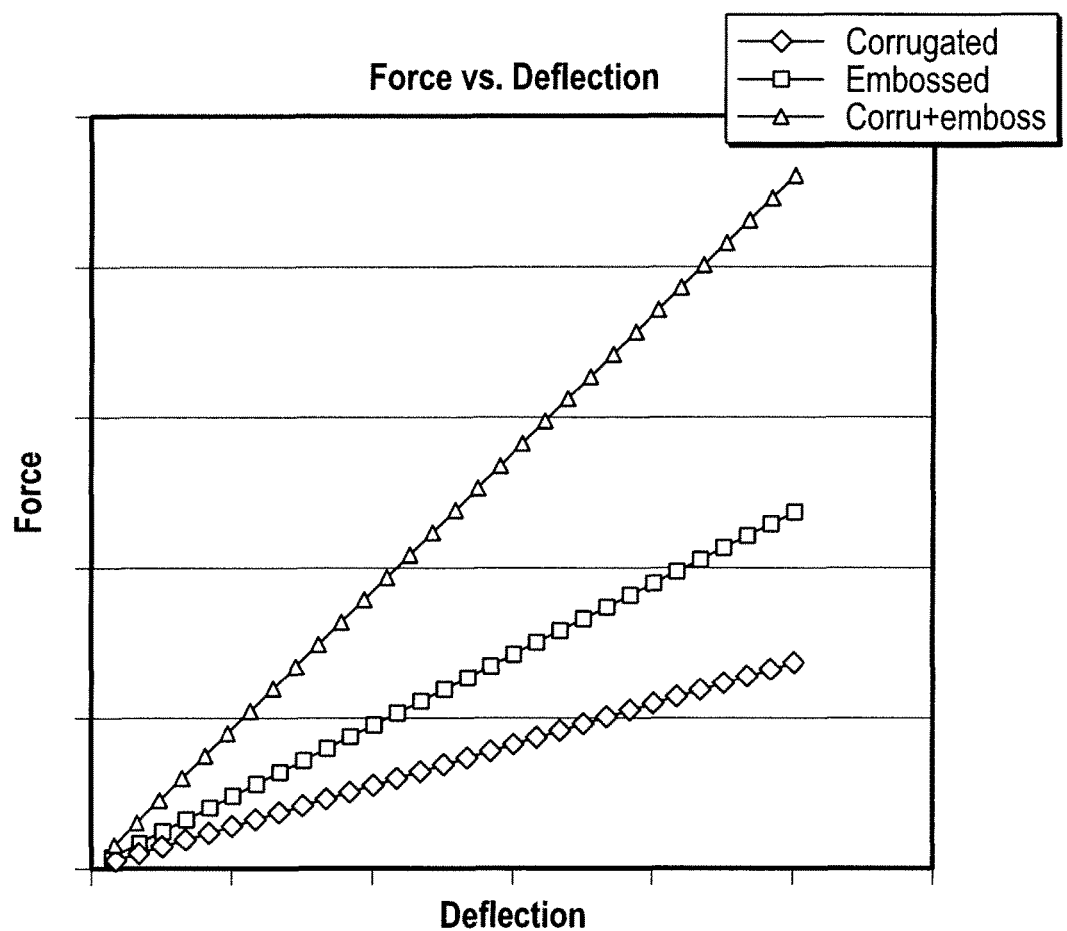
FIG. 4 is a diagram illustrating the increase in strength that results from the combination of small and large corrugations.

The combination of small corrugations 12 and larger corrugations 14 increases the strength of the media. This is demonstrated in FIG. 4 which shows the force versus deflection for standard corrugated media shown in FIG. 1 ("Corrugated"), media that is embossed only with the larger corrugations 14 ("Embossed"), and the media 10 that has the combination of standard corrugations and the larger corrugations ("Corru+emboss").

With reference to FIG, 3, processing of the corrugated media will now be described. In FIG. 3, the media with the smaller corrugations 12 is passed through a pleater mechanism 24 in a media feed direction indicated by the arrow 31. The pleater mechanism 24 creates the larger corrugations 14 on the corrugated media through an embossing mechanism and also scores the media prior to forming the pleats.

After passing through the pleater mechanism 24, the media is directed through a pull-roll mechanism that functions somewhat similarly to a conventional pull-roll mechanism, and finally to an accumulator section which gathers the pleated media. The construction and operation of a pull-roll mechanism and an accumulator section are well-known in the art. However, the pull-roll mechanism should be designed so that the pull-rolls only contact the media in very narrow width strips so as not to flatten out the media having the larger corrugations back to the original corrugated state.

The pleater mechanism 24 includes an upper roller 30 and a lower roller 32. The upper roller 30 and lower roller 32 are spaced apart from one another a distance to form a nip therebetween through which the corrugated media is passed. In one embodiment, the spacing between the rollers 30, 32 is slightly larger than twice the amplitude of the smaller corrugations of the media (i.e., slightly larger than the maximum thickness of the media as defined by the smaller corrugations). This spacing prevents the rollers 30, 32 from collapsing the existing smaller corrugations.

Each roller 30, 32 includes longitudinal scoring bars 34 that extend the longitudinal length of the rollers and may be evenly spaced around the circumference of each roller 30, 32, with the spacing between the bars 34 determining the resulting length of the pleats in the media. The scoring bars 34 project beyond the surface of the roller a sufficient distance to create scores in the media where the media is to be folded to create the pleats. The construction and function of scoring bars is well known to those of ordinary skill in the art.

Each roller 30, 32 further includes a plurality of alternating bosses 36 and channels 38. The bosses 36 and channels 38 extend circumferentially on the rollers 30, 32 between the score bars 34, and extend the entire longitudinal length of the rollers 30, 32. The bosses 36 project beyond the surface of the roller a sufficient distance to create the larger corrugations 14 in the media. The bosses 36 and channels 38 are arranged such that the bosses 36 on the roller 30 are aligned with the channels 38 on the roller 32, while the bosses 36 on the roller 32 are aligned with the channels 38 on the roller 30.

As the corrugated media is passed between the rollers 30, 32, the bosses 36 create the larger corrugations 14 among the smaller corrugations 12 on the media. It is not required that the larger corrugations 14 be formed in direct overlapping relationship with the smaller corrugations 12 (i.e., the peaks of the larger corrugations 14 do not need to match with the peaks of the smaller corrugations). This eliminates the need to precisely align the corrugated media when it is fed into the pleater mechanism 24.

After the larger corrugations 14 are added to the corrugated media in the pleater mechanism 24, the media is directed through a pull-roll section to create the pleat folds, and the pleated media is then accumulated in an accumulator section. The increased strength provided by the combination of smaller corrugations and larger corrugations results in a pleat shape that is more optimal for pleated media by eliminating the bend or curve in the pleats that often results.

In an alternative arrangement, the pleater mechanism includes an embossing roller that is separate from the two opposing scoring rollers (i.e., rollers 30 and 32). In such an arrangement, the embossing roller is upstream of the scoring rollers in the direction of media travel through the pleater mechanism. The embossing roller creates channels in media passing over the embossing roller.

Figure 5:
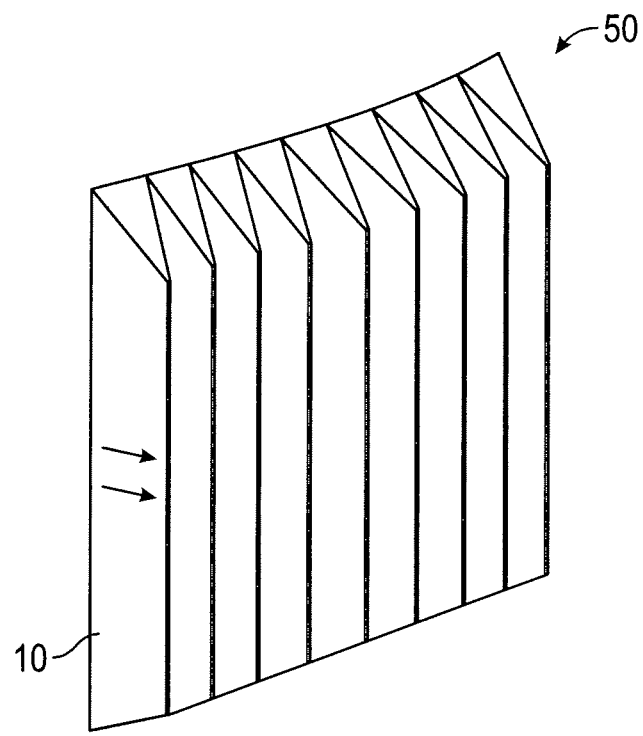
FIG. 5 illustrates an example of a pleated filter formed from the filter media of FIG. 2A.
Figure 6:
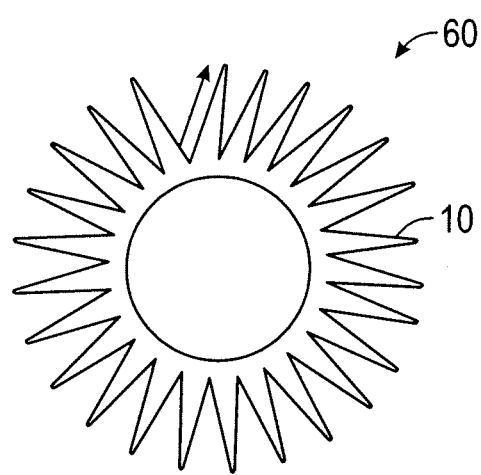
FIG. 6 illustrates another example of a pleated filter formed from the filter media of FIG. 2A.

The resulting pleated media can be used to create any number of filters. FIG. 5 illustrates a planar or panel filter 50 that is formed from the pleated media 10. FIG. 6 illustrates a cylindrical filter 60 that is formed from the pleated media 10. Other filter shapes can be constructed using the pleated media. In FIGS. 5 and 6, the corrugations extend in the direction indicated by the arrows between the pleat tips and the pleat valleys.

Figure 7:
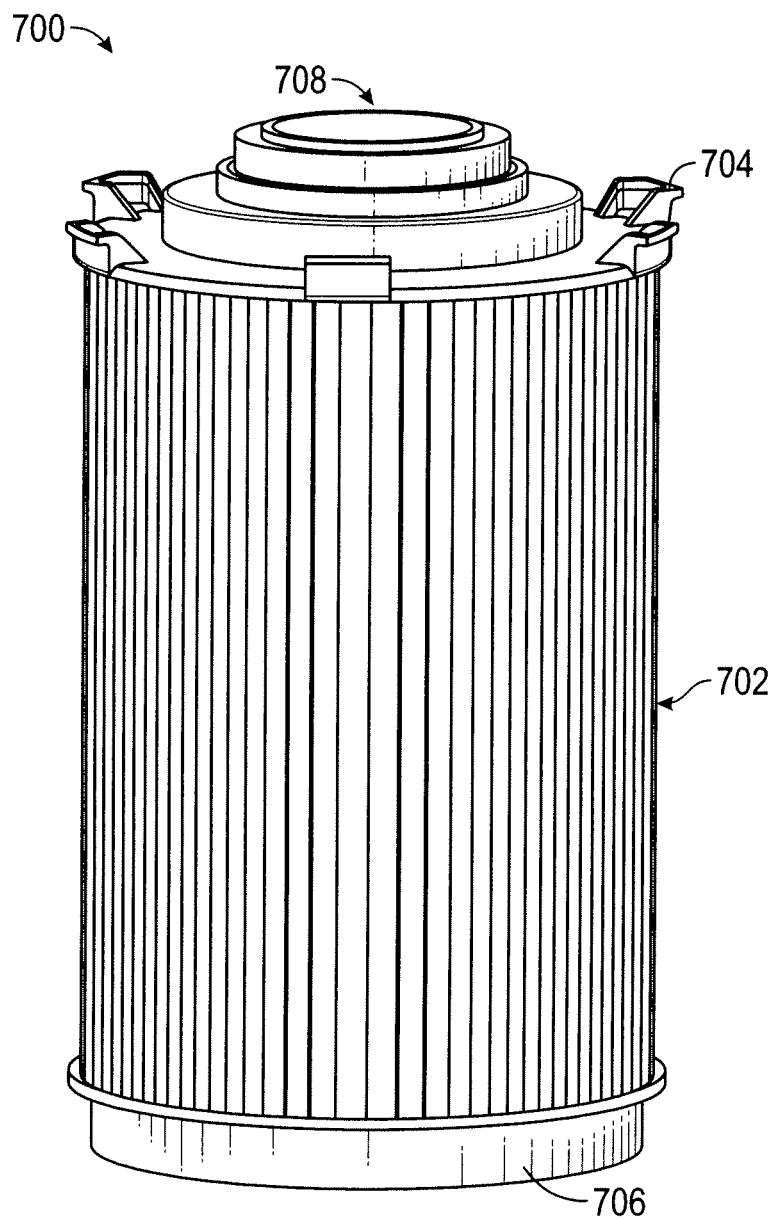
FIG. 7 is an example of a cylindrical filter element utilizing the filter media of FIG. 2A.

With respect to FIG. 7, a cylindrical filter element 700 is shown according to an exemplary embodiment. Cylindrical filter element 700 includes pleated media 702 formed in a cylindrical shape. Pleated media 702 may be media 10 as described above. Pleated media 702 is supported by a first endcap 704 and a second endcap 706. First endcap 704 includes an opening 708 to receive fluid to be filtered. Second endcap 706 is substantially sealed.

Figure 8:
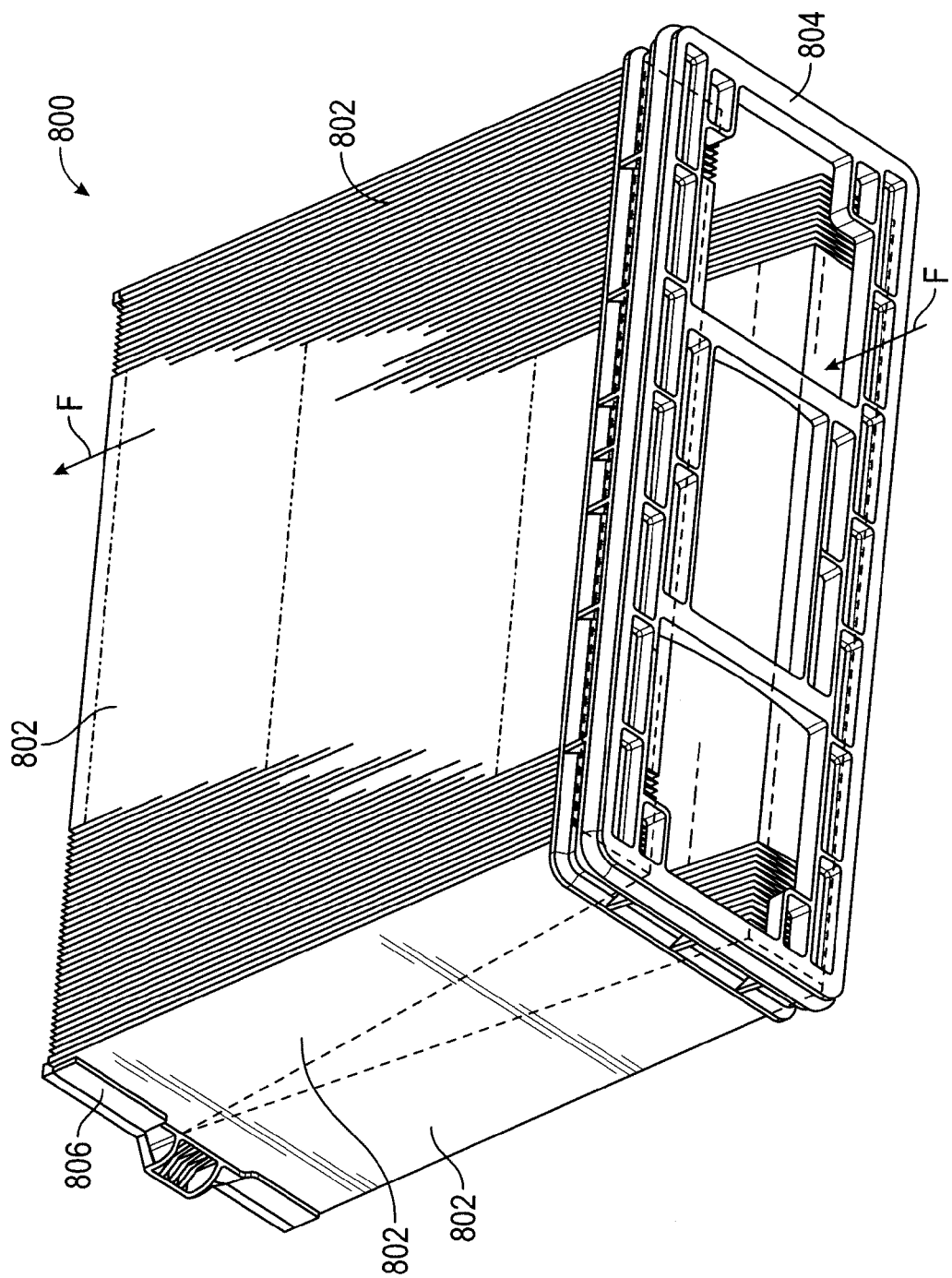
FIG. 8 is an example of a rectangular filter element utilizing the filter media of FIG. 2A.

With respect to FIG. 8, a filter element 800 is shown according to an exemplary embodiment. Filter element 800 includes pleated media 802. Pleated media 802 may be media 10 as described above. Pleated media 802 is supported by a first frame member 804 and a second frame member 806. Fluid to be filtered flows along path F through first frame member 804 and out of pleated media 802.

The described embodiment(s) may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter media comprising:
a filter media layer;
a plurality of first corrugations on a first layer of the filter media layer extending in a first direction and having a first amplitude and a first frequency; and
a plurality of second corrugations on the layer of the filter media layer extending in the first direction and having a second amplitude and a second frequency, the second amplitude greater than the first amplitude, and the second frequency is less than the first frequency, the second corrugations are superimposed on the first corrugations on the first layer of the filter media layer.

2. The filter media of claim 1, wherein the plurality of second corrugations are interspersed among the first corrugations.

3. The filter media of claim 1, wherein the plurality of second corrugations extend upwardly and downwardly from the filter media.

4. The filter media of claim 1, wherein the first amplitude and the first frequency are constant.

5. The filter media of claim 1, wherein the second amplitude and the second frequency are constant.

6. The filter media of claim 1, wherein the first frequency is about 6.3 corrugations per inch.

7. The filter media of claim 6, wherein the second frequency is about 1.33 corrugations per inch.

8. A filter comprising:
a corrugated filter media including:
a filter media layer;
a plurality of first corrugations on a first layer of the filter media layer extending in a first direction and having a first amplitude and a first frequency; and
a plurality of second corrugations on the first layer of the filter media layer extending in the first direction and having a second amplitude and a second frequency, the second amplitude greater than the first amplitude, and the second frequency is less than the first frequency, the second corrugations are superimposed on the first corrugations on the first layer of the filter media layer.

9. The filter of claim 8, wherein the plurality of second corrugations are interspersed among the first corrugations.

10. The filter of claim 8, wherein the plurality of second corrugations extend upwardly and downwardly from the filter media.

11. The filter of claim 8, wherein the first amplitude and the first frequency are constant.

12. The filter of claim 8, wherein the second amplitude and the second frequency are constant.

13. The filter of claim 8, wherein the first frequency is about 6.3 corrugations per inch.

14. The filter of claim 13, wherein the second frequency is about 1.33 corrugations per inch.

15. A method of processing a filter media, the method comprising:
passing a corrugated media having first corrugations on a first media layer through an embossing mechanism to create second corrugations on the first media layer of the corrugated media, the first corrugations having a first amplitude and a first frequency, the second corrugations having a second amplitude that is greater than the first amplitude, the second corrugations having a second frequency that is less than the first frequency, the second corrugations are superimposed on the first corrugations on a sheet of the first media layer.

16. The method of claim 15, further comprising directing the corrugated media through a pull-roll mechanism after passing the corrugated media through the embossing mechanism.

17. The method of claim 16, wherein the pull-roll mechanism is configured to not flatten out the second corrugations in the corrugated media.

18. The method of claim 16, further comprising passing the corrugated media through an accumulator section.

19. The method of claim 15, wherein the embossing mechanism includes a pair of pleating rollers that are spaced apart from one another by a distance approximately equal to twice the first amplitude.

20. The method of claim 15, further comprising scoring the corrugated filter media with lateral scoring bars, the lateral scoring bars extending along a longitudinal length of a set of two opposing pleating rollers.

* * * * *